United States Patent
Baik et al.

(10) Patent No.: US 9,655,119 B2
(45) Date of Patent: May 16, 2017

(54) PRIMARY CHANNEL DETERMINATION IN WIRELESS NETWORKS

(71) Applicant: QUALCOMM Incorporated, San Diego, CA (US)

(72) Inventors: Eugene Jong-Hyon Baik, San Diego, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 161 days.

(21) Appl. No.: 14/487,028

(22) Filed: Sep. 15, 2014

(65) Prior Publication Data

US 2015/0124739 A1 May 7, 2015

Related U.S. Application Data

(60) Provisional application No. 61/901,416, filed on Nov. 7, 2013.

(51) Int. Cl.
*H04W 72/04* (2009.01)
*H04L 5/00* (2006.01)

(52) U.S. Cl.
CPC ....... *H04W 72/0453* (2013.01); *H04L 5/0091* (2013.01)

(58) Field of Classification Search
CPC ............. H04W 72/04; H04W 72/0406; H04W 72/0413; H04W 72/042; H04W 72/044; H04W 72/0453; H04W 72/046
See application file for complete search history.

(56) References Cited

U.S. PATENT DOCUMENTS

| 2012/0026997 | A1 | 2/2012 | Seok et al. | |
| 2012/0122461 | A1* | 5/2012 | Hossain | H04W 72/085 455/450 |
| 2013/0130731 | A1* | 5/2013 | Kim | H04W 52/146 455/501 |
| 2013/0176980 | A1* | 7/2013 | Kneckt | H04W 28/26 370/329 |
| 2013/0229996 | A1 | 9/2013 | Wang et al. | |

(Continued)

FOREIGN PATENT DOCUMENTS

| WO | WO-2011162524 A2 | 12/2011 | |
| WO | WO 2012091478 A2 * | 7/2012 | ........ H04W 52/146 |

OTHER PUBLICATIONS

International Search Report and Written Opinion—PCT/US2014/055817—ISA/EPO—Nov. 28, 2014.

(Continued)

*Primary Examiner* — Benjamin H Elliott, IV
(74) *Attorney, Agent, or Firm* — Patterson & Sheridan, L.L.P.

(57) ABSTRACT

Certain aspects of the present disclosure generally relate to techniques and apparatus for determining a primary channel for wireless communication. According to certain aspects, a method is provided for wireless communications by an apparatus. The method generally includes obtaining an information element (IE) with one or more parameters and computing a primary channel location to be used for the wireless communication, as a function of the one or more parameters, wherein the function is independent of a geographical area in which the apparatus is located.

18 Claims, 6 Drawing Sheets

(56) References Cited

U.S. PATENT DOCUMENTS

| | | |
|---|---|---|
| 2013/0286959 A1 | 10/2013 | Lou et al. |
| 2014/0003361 A1 | 1/2014 | Song et al. |
| 2015/0124739 A1* | 5/2015 | Baik ................ H04W 72/0453 370/329 |
| 2015/0189639 A1* | 7/2015 | Zhang ................ H04L 1/0025 370/330 |

OTHER PUBLICATIONS

Park M (Intel Corp) : "Proposed TGah Draft Amendment"; IEEE P802.11 Wireless LANs; IEEE-SA Mentor, Piscataway, NJ USA, doc.: IEEE 802.11-13/0500R0, May 10, 2013 (May 10, 2013), pp. 1-330, XP068054010.

* cited by examiner

PRIMARY CHANNEL DETERMINATION IN WIRELESS NETWORKS

CROSS-REFERENCE TO RELATED APPLICATION(S)

This application claims benefit of U.S. Provisional Patent Application Ser. No. 61/901,416, filed Nov. 7, 2013, which is herein incorporated by reference in its entirety.

BACKGROUND

Field of the Disclosure

Certain aspects of the present disclosure generally relate to wireless communications and, more specifically, to primary channel determination in wireless networks.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques, corresponding apparatus, and program products, for primary channel determination.

Certain aspects of the present disclosure provide an apparatus for wireless communications. The apparatus generally includes an interface configured to obtain an information element (IE) with one or more parameters and a processing system configured to compute a primary channel location to be used for the wireless communication, wherein the computation is based on the one or more parameters and a function that is independent of a geographical area in which the apparatus is located.

Certain aspects of the present disclosure provide a method for wireless communications. The method generally includes obtaining an IE with one or more parameters and computing a primary channel location to be used for the wireless communication by an apparatus, wherein the computation is based on the one or more parameters and a function that is independent of a geographical area in which the apparatus is located.

Certain aspects of the present disclosure provide an apparatus for wireless communications. The apparatus generally includes means for obtaining an IE with one or more parameters and means for computing a primary channel location to be used for the wireless communication, wherein the computation is based on the one or more parameters and a function that is independent of a geographical area in which the apparatus is located.

Certain aspects of the present disclosure provide a station for wireless communication. The station generally includes at least one antenna; a processor configured to obtain, via the at least one antenna, an IE with one or more parameters and compute a primary channel location to be used for the wireless communication, wherein the computation is based on the one or more parameters and a function that is independent of a geographical area in which the station is located.

Certain aspects of the present disclosure provide a computer program product for wireless communications. The computer program product generally includes a computer readable medium having instructions stored thereon for: obtaining an IE with one or more parameters and computing a primary channel location to be used for the wireless communication, wherein the computation is based on the one or more parameters and a function that is independent of a geographical area in which the apparatus is located.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
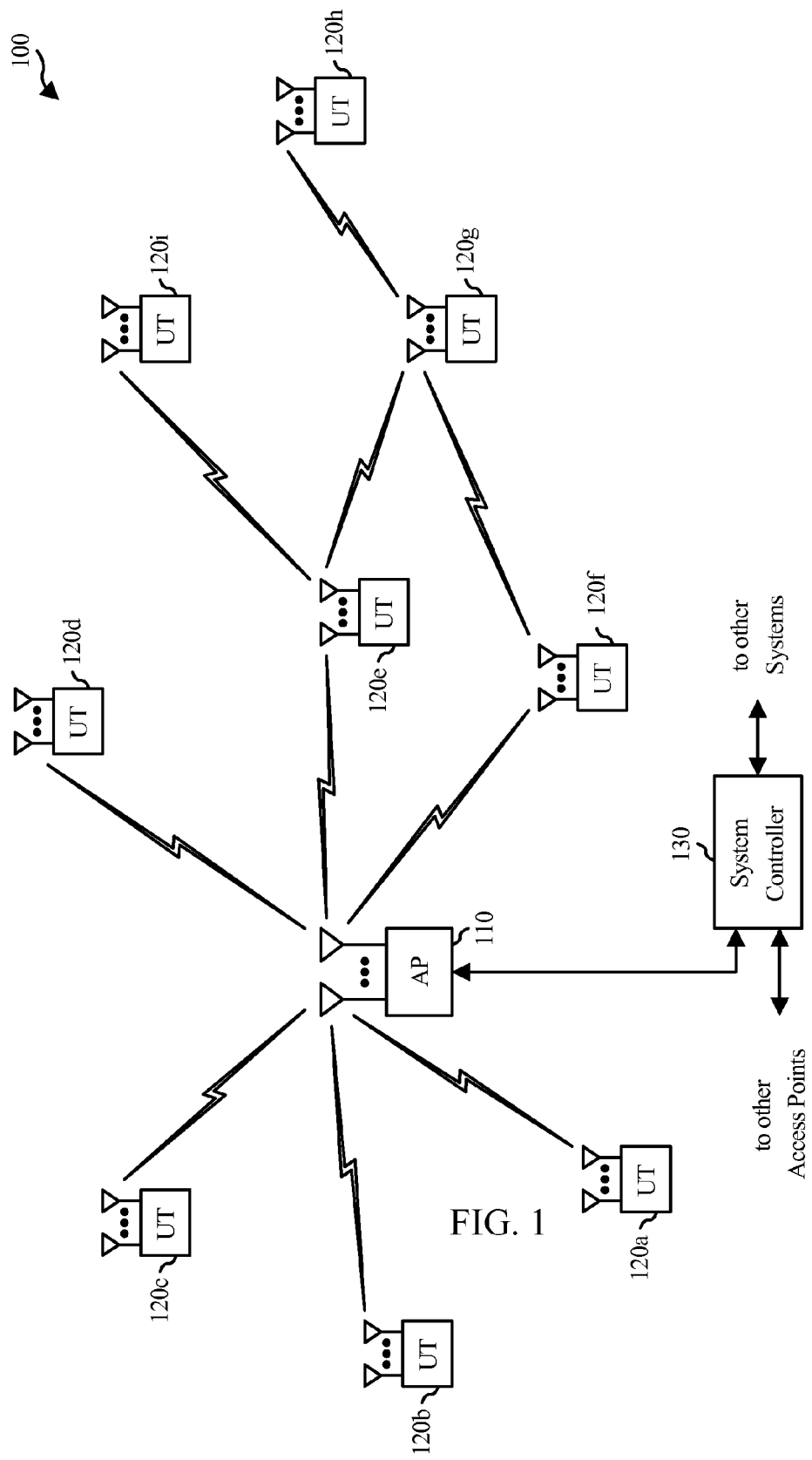
FIG. 1 illustrates a diagram of an example wireless communications network, in accordance with certain aspects of the present disclosure.

Certain aspects of the present disclosure generally relate to systems, methods, and devices for primary channel determination in wireless systems (e.g., in an IEEE 802.11ah system). According to certain aspects, various signaling may be defined that includes an information element (IE) that includes parameters which may be used for computation of Primary channel location. The use of the signaled parameters allow for computation of the Primary channel location independent of geographic location (e.g., without use of a Country Element).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Modulation
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
SDMA . . . Spatial-Division Multiple Access
SIFS . . . Short Interframe Space
SIG . . . Signal (e.g., Sub 1 GHz)
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network An Example Wireless Communication System The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The MIMO system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The MIMO system 100 may also be a TDMA system if the user terminals 120 share the same frequency channel by dividing transmission/reception into different time slots, each time slot being assigned to different user terminal 120.

Figure 2:
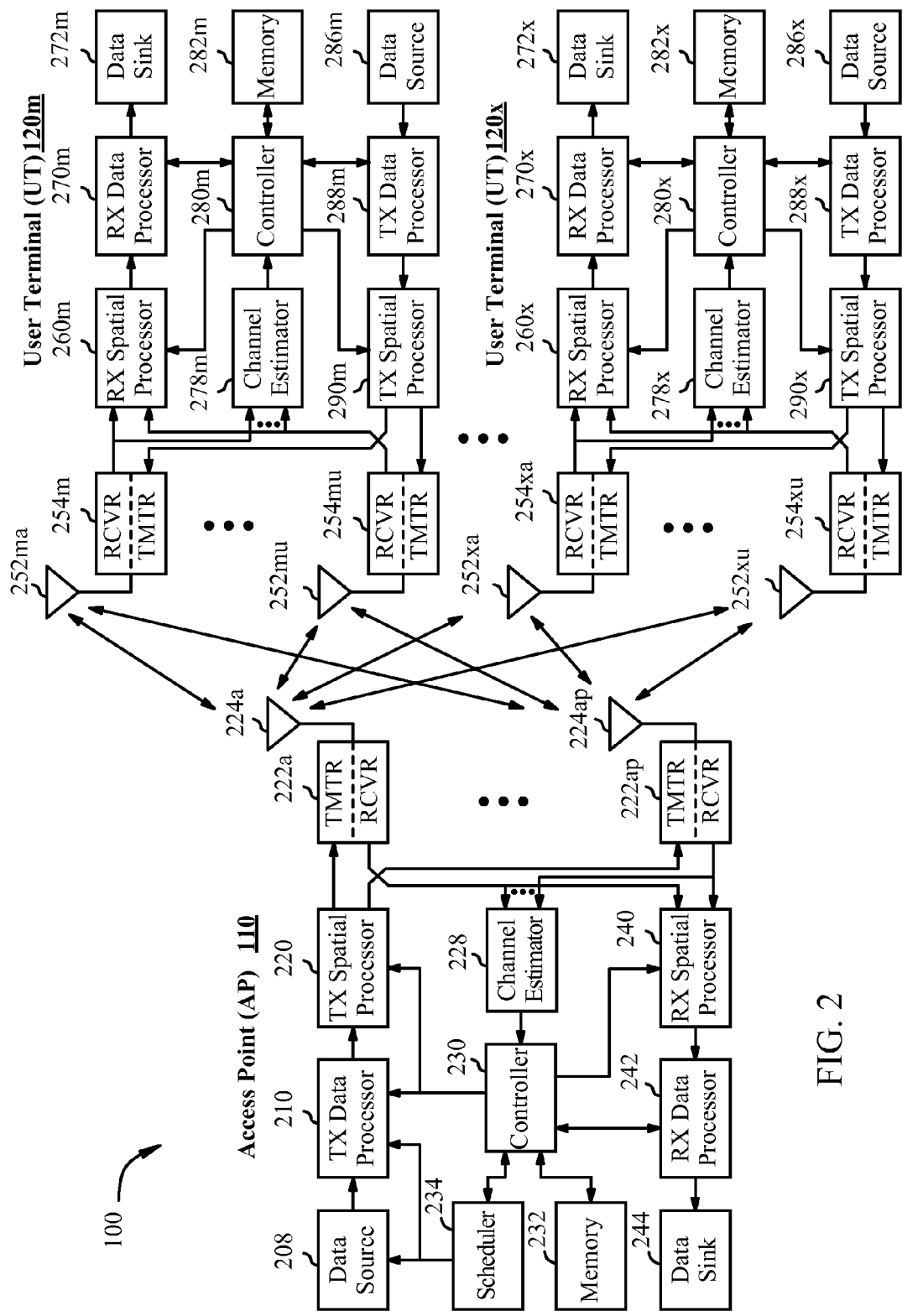
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) of transceiver 254 receives and processes (e.g., converts to analog, amplifies, filters, and frequency upconverts) a respective transmit symbol stream to generate an uplink signal. $N_{ut,m}$ transmitter units of transceiver 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) of transceiver 222. Each receiver unit of transceiver 222 performs processing complementary to that performed by transmitter unit (TMTR) of transceiver 254 of the user terminal 120 and provides a received symbol stream. An RX spatial processor 240 performs receiver spatial processing on the $N_{ap}$ received symbol streams from $N_{ap}$ receiver units of transceiver 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit of transceiver 222 receives and processes a respective transmit symbol stream to generate a downlink signal. $N_{ap}$ transmitter units of transceiver 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit of transceiver 254 processes a received signal from an associated antenna 252 and provides a received symbol stream. An RX spatial processor 260 performs receiver spatial processing on $N_{ut,m}$ received symbol streams from $N_{ut,m}$ receiver units of transceiver 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
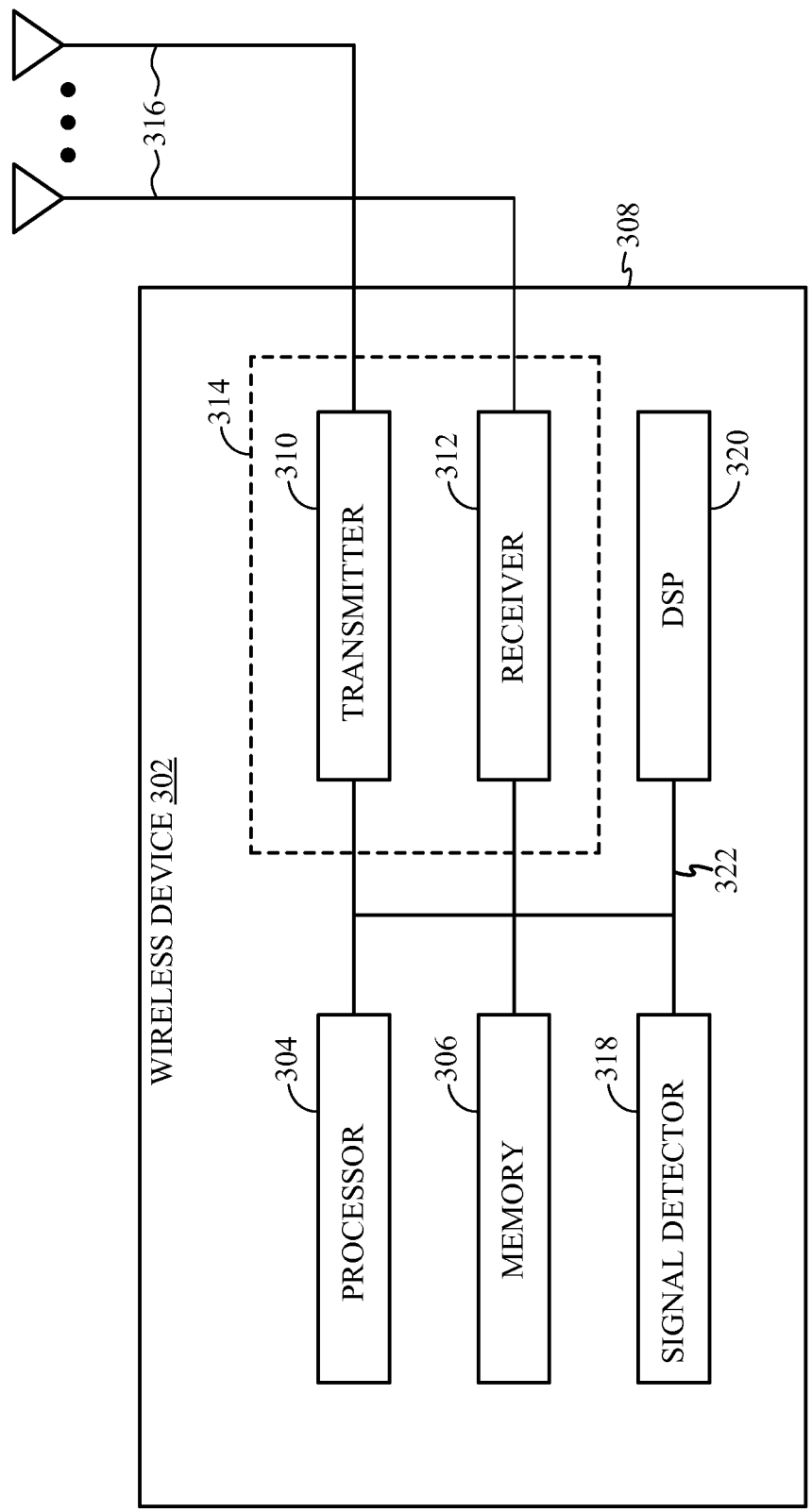
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some wireless systems, the method and framework for determining a location of a primary channel for wireless communication is inflexible. For example, within a country, the primary channel may be tied to a single starting frequency (e.g., defined by country channelization). For example, in 802.11ac systems, Primary Channel location may be determined by equations in section 22.3.14 Channelization of the 802.11ac wireless standard (e.g., Equation 22-102 determines Channel center frequency, while Equation 22-103 determines Primary 20 MHz channel center frequency). Parameters/values used for Primary Channel location calculation may be obtained from Country Element (Section 8.4.2.10 of the 802.11ac wireless standard) and VHT Operation Element (Section 8.4.2.161 of the 802.11ac wireless standard).

Physical location of Primary channel may be determined by equations in section 24.3.13 Channelization of the 802.11ac wireless standard, which uses country-specific parameters contained in tables of Annex E. Country information may be obtained from Country Element (described in section 8.4.2.10 of the 802.11ac wireless standard). Therefore, knowing country code will allow device to know starting carrier frequency for computing primary channel location. Additionally, this technique may use parameters signaled by the Information Element (IE) described in section 8.4.2.170w S1G Operation Element of the 802.11ac wireless standard. For example, Channel Width and Primary channel number allows device to compute offset with respect to the start carrier frequency, to obtain final 2 MHz Primary channel location.

This technique, however, lacks flexibility. For example, a device determining its primary channel will use information in Country Element (matching it to parameters specified in Annex E), and additionally use Primary Channel Number field value of S1G Operation Element to compute location of Primary channel location. Unfortunately, if a country has multiple bands, tables in Annex E may need to indicate different starting frequencies for the separate bands and this will require changes to equation used to compute Primary channel location or require large bitwidth for Primary Channel Number to cover possible frequency range. Additionally, if country decides to open new frequency bands for 11ah in the future, current equation/procedure may not be able to accommodate channel location signaling (e.g. if bands open up BELOW current starting frequency within a country)

Example Primary Channel Determination

Aspects of the present disclosure provide techniques, however, that may provide some flexibility in primary channel determination, for example, by decoupling primary channel determination from a geographical area in which the apparatus is located (e.g., the current town, state, or country).

The techniques presented herein provide flexible methods for signaling and calculating Primary channel location (e.g., within the basic service set (BSS) bandwidth), for example, by including one or more fields in an operation element (e.g., a sub-1 GHz "S1G" Operation Element). Such fields may include operating class parameters, such as a Global operating class parameter that can be used to determine the starting frequency of band of operation, a channel width parameter specifying a band of operation, and an index, such as a primary channel index parameter, that can be used to determine a channel offset (e.g., with respect to the starting frequency).

Figure 4:
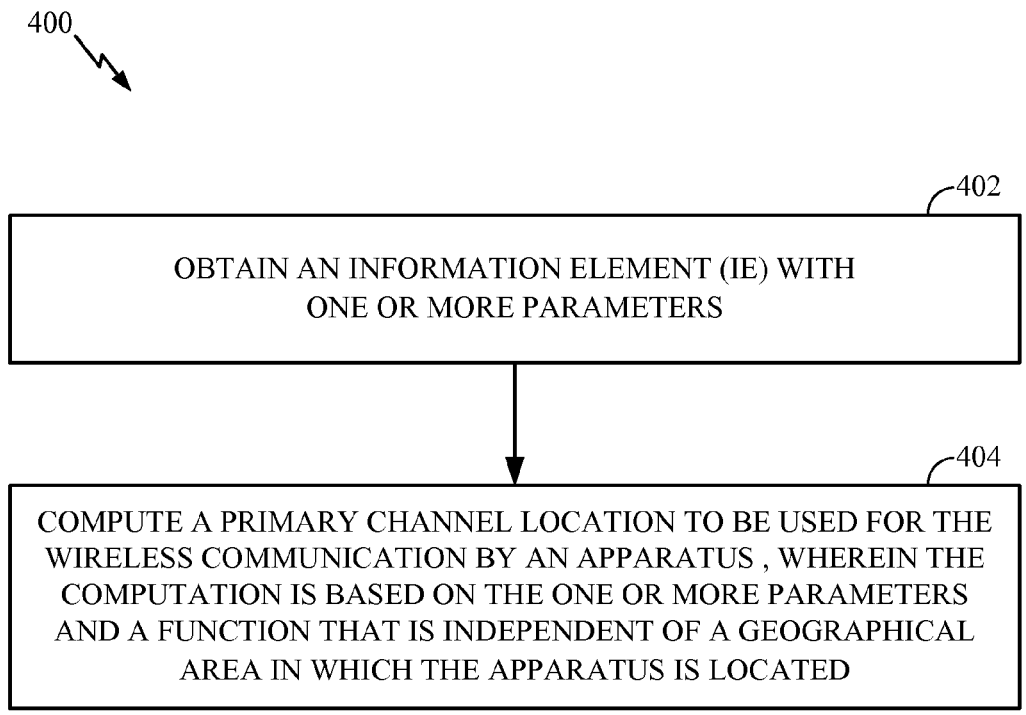
FIG. 4 illustrates a block diagram of example operations for wireless communications, in accordance with certain aspects of the present disclosure.

FIG. 4 illustrates a block diagram of example operations 400 for determining a primary channel for wireless communications, in accordance with certain aspects of the present disclosure. The operations 400 may be performed, for example, by any type of wireless device or station (e.g., such as wireless device 302).

The operations 400 may begin, at 402, by obtaining an information element (IE) with one or more parameters. For example, a first parameter to be used to determine a channel width (e.g., operational bandwidth), a second parameter to be used to determine a starting frequency for the wireless communication, and a third parameter to be used to compute an offset with respect to the starting frequency. According to certain aspects, the second parameter may be mapped to the starting frequency. According to certain aspects, the second parameter may also to be used to determine a channel width. According to certain aspects, the parameters may include at least a first operating class parameter. Different values of the second operating class parameter may map to different combinations of values for a set of operating parameters. The set of operating parameters may include any combination of a channel starting frequency, a channel spacing, a channel center frequency index, or limits on behavior of the apparatus.

At 404, the wireless device may compute a primary channel location to be used for the wireless communication by an apparatus (e.g., for channel switching), wherein the computation is based on the one or more parameters and a function that is independent of a geographical area in which the apparatus is located. For example, the third parameter may be an index and the function may be used to determine the primary channel location based on the starting frequency and the offset calculated based on the index and a frequency constant.

As used herein, the function may be described as independent because determination of the primary channel location is decoupled from the location. In other words, the primary channel is not strictly determined by the geographical area in which the device is located. Currently, the starting frequency may be correlated with geographic area, but the techniques presented herein allow a device to determine a primary channel without knowledge of the location.

Figure 5:
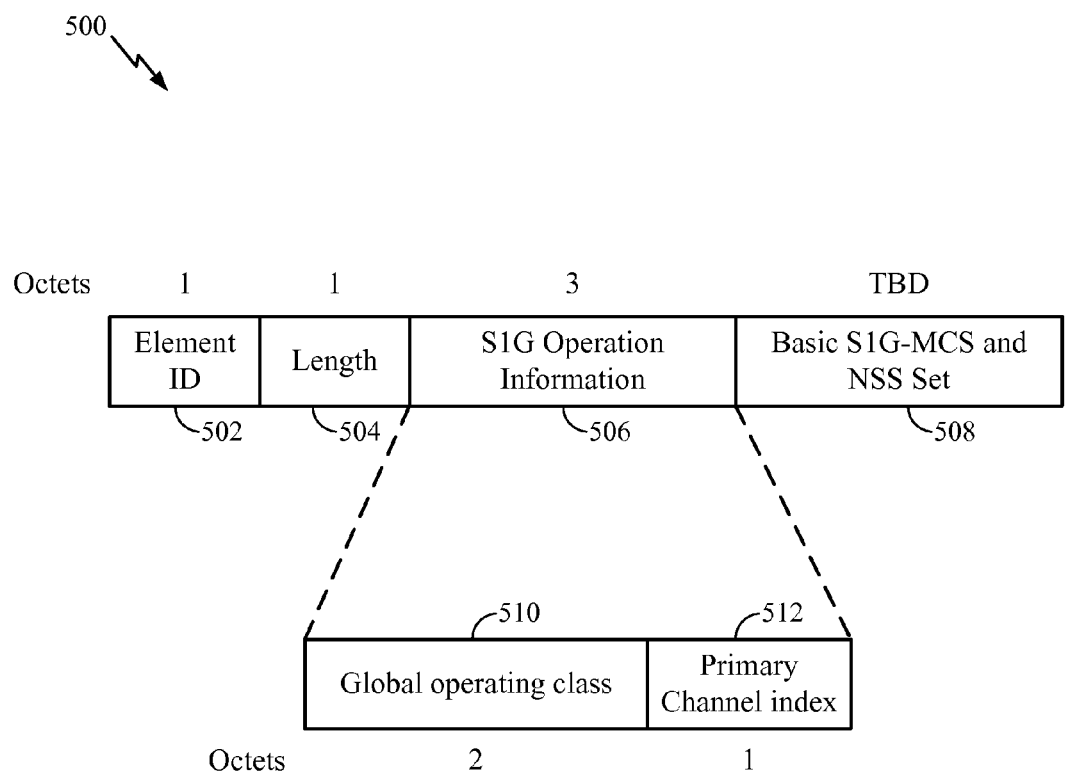
FIGS. 5-7 illustrate example information elements, in accordance with certain aspects of the present disclosure.

FIG. 5 illustrates an example IE 500 with one or more parameters a device (e.g., such as wireless device 300) may use to compute a primary channel location, in accordance with aspects of the present disclosure. As illustrated, the example IE 500 may include an Element ID field 502, a Length field 504, a S1G Operation Information field 506, and a Basic S1G-MCS and NSS Set field 508. According to certain aspects, the S1G Operation Information field 506 may include the following subfields: a Global operating class subfield 510 (e.g., two octets) and Primary channel index subfield 512 (e.g., one octet). A value of the Global operating class subfield 510 may specify a set of operating parameters including, for example, a starting frequency, channel width (some definition from Table E-4 of the 802.11ac wireless standard may be reused, such as, channel center frequency indices and behavior limit sets). The Primary channel index subfield 512 may be used by the device to compute frequency offset, with respect to starting frequency, at which the Primary 2 MHz channel will reside.

According to certain aspects, a function that uses the Global operating class subfield 510 and Primary channel index subfield 512 in the computation of the primary channel location may be as follows:

$$\text{Primary channel location} = f(\text{Global operating class}) + (500 \text{ KHz} * \text{Primary channel index})$$

where f( ) may represent a function that maps a value of the Global operating class subfield 510 to a starting carrier frequency. According to certain aspects, information from the Country Element may no longer be used for computation of the primary channel location, as all the parameters used may be determined from Global operating class value.

In some cases, different countries may use the same Global operating class value if their operating parameters align within a frequency band. Further, any given country can additionally support multiple Global operating classes. As an example, a country may have multiple bands at different starting carrier frequencies, with potentially different operating restrictions (e.g. transmission power).

Figure 6:
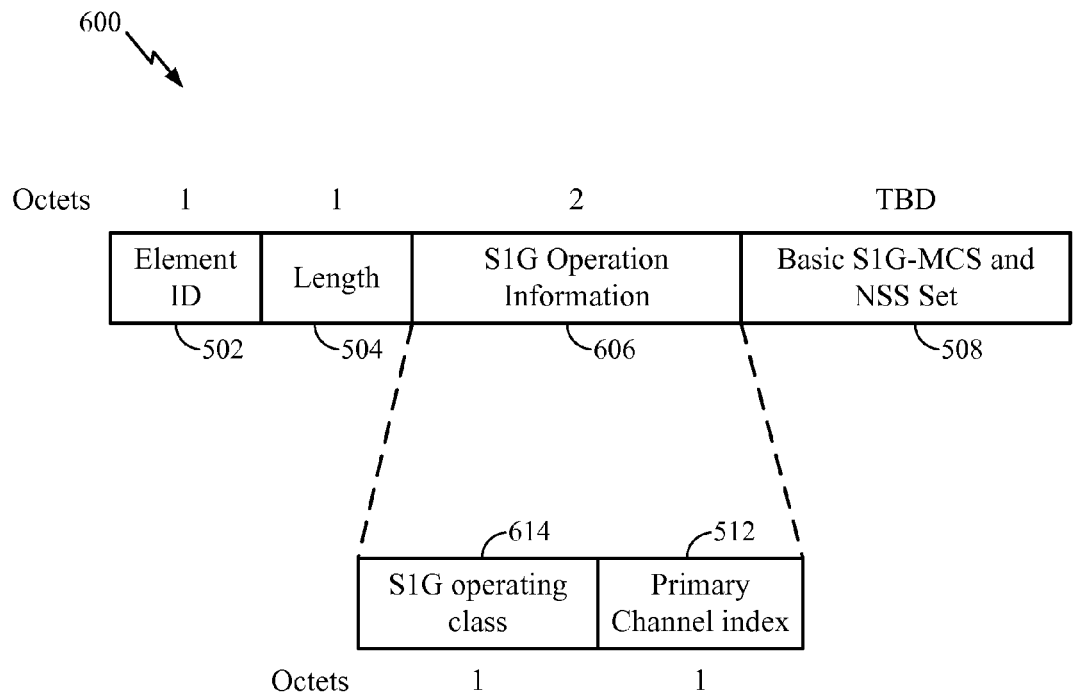

FIG. 6 illustrates another example IE 600 with one or more parameters a device may use to compute a primary channel location, in accordance with aspects of the present disclosure. The IE 600 may include the same fields as the IE 500; however, in this example, the S1G Operation Information field 606 may include S1G operating class subfield 614 instead of the Global operating class subfield 510. The Global operating class subfield 510 may be a so-called "legacy" parameter used across different 802.11 wireless standards, and may involve additional overhead. For example, as shown in FIG. 5, the Global operating class subfield 510 may use two or more octets to signal, whereas, as shown in FIG. 6, the S1G operating class subfield 614 may use only one octet to signal. The S1G operating class subfield 614 may carry the same information as the Global operating class subfield 510 (e.g. start frequency, channel spacing, etc.) but local to the 802.11ah wireless standard. This approach may reduce a size of a field carrying this parameter. For example, as shown in FIG. 5, the S1G Operation Information field 506 is three octets, in order to carry the two octet Global operating class subfield 510 and the one octet Primary Channel index subfield 512, whereas, as shown in FIG. 6, the S1G Operation Information field 606 is two octets, in order to carry the one octet S1G operating class subfield 614 and the one octet Primary Channel index subfield 512

Figure 7:
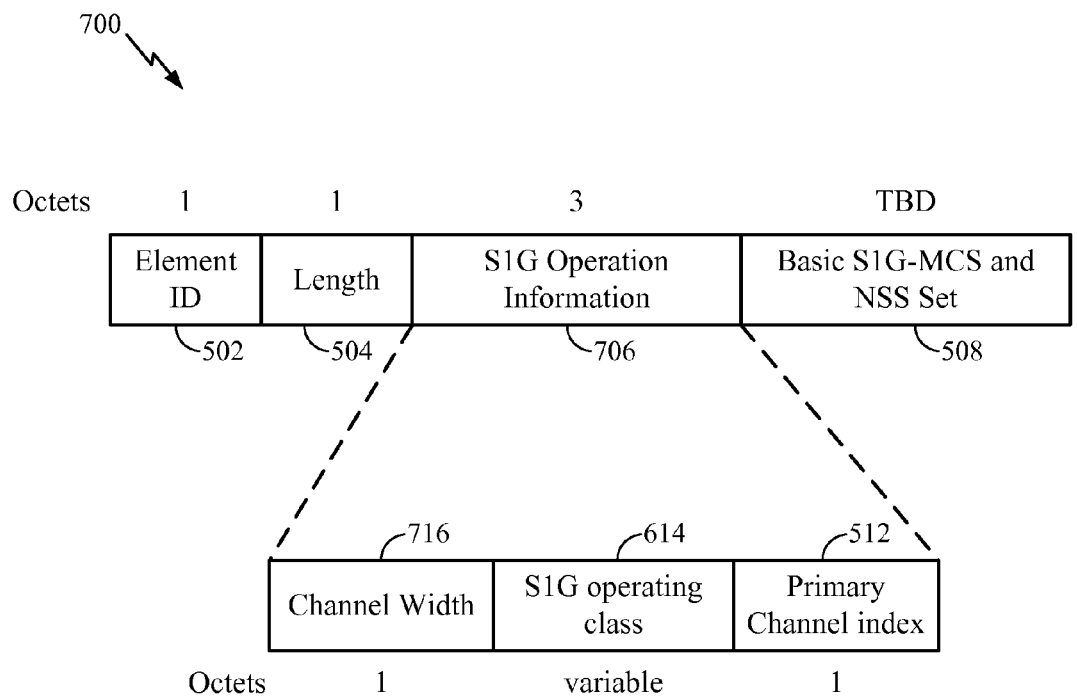

FIG. 7 illustrates another example IE 700 with one or more parameters a device may use to compute a primary channel location, in accordance with aspects of the present disclosure. As illustrated, the example IE 700 may include the same fields as the example IE 600. However, in this case, the S1G Operating class subfield 614 (which may also be referred to as "Operating Class" field). Instead, signal bandwidth of operation may be signaled, for example, with a separate Channel Width subfield 716 of the S1G Operation Information field 706. Additionally, according to certain aspects, the S1G Operating class subfield 614 may be a variable length (e.g., 1 octet or 2 octets) field. The Primary channel index subfield 512 may also be referred to as "Primary Channel number". In this example implementation, computation of the primary channel location may also be a function of the band of operation indicated in the Channel Width subfield 716.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c., as well as a-a, a-a-a, a-a-b, a-a-c, a-b-b, a-c-c, b-b, b-b-b, b-b-c, c-c, and c-c-c or any other ordering of a, b, and c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Figure 4A:
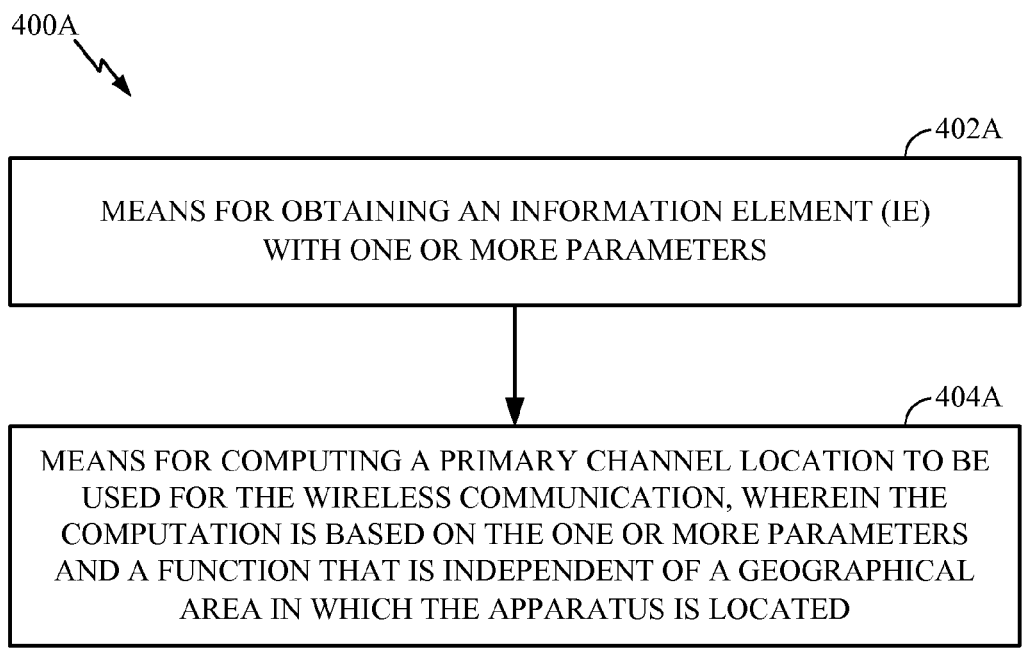
FIG. 4A illustrates example means capable of performing the operations shown in FIG. 4, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A. For example, means for determining a primary channel for a wireless system may include means 402A for obtaining an information element (IE) with one or more parameters and means 404A for computing a primary channel location to be used for the wireless communication, wherein the computation is based on the one or more parameters and a function that is independent of a geographical area in which the apparatus is located.

For example, means for transmitting may comprise a transmitter (e.g., the transmitter unit of transceiver 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit of transceiver 222) and/or an antenna(s) 224 of the access point 110 illustrated in FIG. 2 or the receiver 312 and/or antenna(s) 316 depicted in FIG. 3.

Means for processing, means for determining, means for generating, means for outputting, means for computing, and/or means for obtaining may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions). For example, an algorithm for determining a primary channel may take, as input, an information element (IE) with one or more parameters and an algorithm for computing a primary channel location to be used for the wireless communication, wherein the computation is based on the one or more parameters and a function that is independent of a geographical area in which the apparatus is located.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, a computer-readable medium may have instructions stored thereon for obtaining an information element (IE) with one or more parameters and instructions stored thereon for computing a primary channel location to be used for the wireless communication, wherein the computation is based on the one or more parameters and a function that is independent of a geographical area in which the apparatus is located. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
an interface configured to obtain an information element (IE) comprising a plurality of parameters; and
a processing system configured to compute a primary channel location to be used for the wireless communication, wherein the computation is based on the plurality of parameters and a function that is independent of a geographical area in which the apparatus is located, wherein the plurality of parameters comprise:
one or more operating class parameter in a first field of the IE; and
a channel width parameter in a second field of the IE; and
another interface configured to output for transmission a signal based on the computed primary channel location.

2. The apparatus of claim 1, wherein the processing system is configured to:
determine a starting frequency for the wireless communication based on a first parameter of the plurality of parameters; and
determine an offset with respect to the starting frequency based on a second parameter of the plurality of parameters.

3. The apparatus of claim 2, wherein the processing system is configured to determine the starting frequency for the wireless communication based on the first parameter of the plurality of parameters by determining a mapping of the first parameter to the starting frequency.

4. The apparatus of claim 1, wherein the processing system is configured to:
determine a channel width based on the channel width parameter.

5. The apparatus of claim 2, wherein:
the second parameter comprises an index; and
the processing system is configured to determine the offset based on the index and a frequency constant.

6. The apparatus of claim 1, wherein the plurality of parameters further comprise:
an index field in a third field of the IE.

7. The apparatus of claim 6, wherein different values of the first operating class parameter map to different combinations of values for a set of operating parameters.

8. The apparatus of claim 7, wherein the set of operating parameters comprise at least two of: a channel starting frequency, a channel center frequency index, or limits on behavior of the apparatus.

9. A method for wireless communication by an apparatus, comprising:
obtaining an information element (IE) comprising a plurality of parameters;
computing a primary channel location to be used for the wireless communication by an apparatus, wherein the computation is based on the plurality of parameters and a function that is independent of a geographical area in which the apparatus is located, wherein the plurality of parameters comprise:
one or more operating class parameter in a first field of the IE; and
a channel width parameter in a second field of the IE; and
outputting for transmission a signal based on the computed primary channel location.

10. The method of claim 9, further comprising:
determining a starting frequency for the wireless communication based on a first parameter of the plurality of parameters; and
determining an offset with respect to the starting frequency based on a second parameter of the plurality of parameters.

11. The method of claim 10, further comprising:
determining the starting frequency for the wireless communication based on the first parameter of the plurality of parameters by determining a mapping of the first parameter to the starting frequency.

12. The method of claim 9, further comprising:
determining a channel width based on the channel width parameter.

13. The method of claim 10, wherein:
the second parameter comprises an index; and
determining the offset comprises determining the offset based on the index and a frequency constant.

14. The method of claim 9, wherein the plurality of parameters further comprise:
an index field in a third field of the IE.

15. The method of claim 14, wherein different values of the first operating class parameter map to different combinations of values for a set of operating parameters.

16. The method of claim 15, wherein the set of operating parameters comprise at least two of: a channel starting frequency, a channel center frequency index, or limits on behavior of the apparatus.

17. A non-transitory computer readable medium having instructions stored thereon for:
obtaining an information element (IE) comprising a plurality of parameters; and
computing a primary channel location to be used for the wireless communication by an apparatus, wherein the computation is based on the plurality of parameters and a function that is independent of a geographical area in which the apparatus is located, wherein the plurality of parameters comprise:
one or more operating class parameter in a first field of the IE; and
a channel width parameter in a second field of the IE; and
outputting for transmission a signal based on the computed primary channel location.

18. A station for wireless communications, comprising:
a receiver configured to receive an information element (IE) comprising a plurality of parameters; and
a processing system configured to compute a primary channel location to be used for the wireless communications, wherein the computation is based on the plurality of parameters and a function that is independent of a geographical area in which the station is located, wherein the one plurality of parameters comprise:
one or more operating class parameter in a first field of the IE; and
a channel width parameter in a second field of the IE; and
a transmitter configured to transmit a signal based on computed primary channel location.

* * * * *